US007721438B2

(12) United States Patent
Ichikawa et al.

(10) Patent No.: US 7,721,438 B2
(45) Date of Patent: May 25, 2010

(54) ASSEMBLING METHOD USING MARKED INFORMATION AND ASSEMBLY ASSEMBLED BY SAID ASSEMBLING METHOD

(75) Inventors: Yukihito Ichikawa, Nagoya (JP); Eiji Ito, Yokkaichi (JP); Koichi Ikeshima, Okazaki (JP); Masayoshi Miwa, Nagoya (JP); Shinichi Tosa, Utsunomiya (JP); Tomomi Sugiyama, Utsunomiya (JP)

(73) Assignees: NGK Insulators, Ltd., Nagoya (JP); Honda Giken Kogyo Kabushiki Kaisha, Minato-ku (JP)

( * ) Notice: Subject to any disclaimer, the term of this patent is extended or adjusted under 35 U.S.C. 154(b) by 945 days.

(21) Appl. No.: 10/169,794

(22) PCT Filed: Nov. 16, 2001

(86) PCT No.: PCT/JP01/10004

§ 371 (c)(1),
(2), (4) Date: Jul. 9, 2002

(87) PCT Pub. No.: WO02/40216

PCT Pub. Date: May 23, 2002

(65) Prior Publication Data

US 2004/0013582 A1  Jan. 22, 2004

(30) Foreign Application Priority Data

Nov. 17, 2000  (JP) .............................. 2000-351679

(51) Int. Cl.
*B21D 51/16* (2006.01)
*B01D 53/94* (2006.01)

(52) U.S. Cl. .............................. 29/890; 29/508; 29/516; 29/407.05; 422/179; 422/180

(58) Field of Classification Search ................... 29/890, 29/508, 516, 517, 407.05; 422/179, 168, 422/177, 180
See application file for complete search history.

(56) References Cited

U.S. PATENT DOCUMENTS 3,578,505 A * 5/1971 Harrison et al. ............. 502/101

(Continued)

FOREIGN PATENT DOCUMENTS

EP   0 681 095 A1   11/1995

(Continued)

*Primary Examiner*—David P Bryant
*Assistant Examiner*—Sarang Afzali
(74) *Attorney, Agent, or Firm*—Burr & Brown

(57) ABSTRACT

An assembling method for an assembly is provided: the assembly comprising a cell structure (1) housed and held in a metal vessel (5) via a compressible material having a cushioning property (7) by arranging it between outer periphery of the structure (1) and the vessel (5) in a compressed state with applying a mounting pressure to the structure (1) via the material (7) to hold the structure (1) in the vessel (5). Information regarding outside dimension of the structure (1) and/or inside dimension of the vessel (5) being marked on their surfaces prior to the start of assembly, and the information is read, and a cell structure (1) and a metal vessel (5) are selected based on read information in assembly to achieve a proper holding condition therebetween. Regardless of variations in external dimension of the structure, etc. constituting the assembly, the minimization thereof, and proper holding state may be achieved easily without causing a fracture of the structure, etc.

14 Claims, 5 Drawing Sheets

U.S. PATENT DOCUMENTS

| | | | |
|---|---|---|---|
| 3,751,282 A * | 8/1973 | Massa | 427/267 |
| 4,137,373 A * | 1/1979 | Jalan et al. | 429/44 |
| 5,010,693 A * | 4/1991 | Hatch | 451/90 |
| 5,611,198 A | 3/1997 | Lane et al. | |
| 5,755,025 A * | 5/1998 | Wirth et al. | 29/840 |
| 5,829,250 A | 11/1998 | Lane et al. | |
| 5,866,079 A * | 2/1999 | Machida et al. | 422/179 |
| 5,914,178 A * | 6/1999 | Sol et al. | 428/195.1 |
| 5,990,197 A | 11/1999 | Escano et al. | |
| 6,389,693 B1 * | 5/2002 | Aranda et al. | 29/890 |
| 6,393,249 B1 * | 5/2002 | Aslam et al. | 399/333 |
| 6,948,243 B2 * | 9/2005 | Ichikawa et al. | 29/890 |

FOREIGN PATENT DOCUMENTS

| | | | |
|---|---|---|---|
| EP | 0 918 145 A2 | | 5/1999 |
| EP | 0 982 480 A2 | | 3/2000 |
| JP | 63-7847 | | 1/1988 |
| JP | 63-168517 | | 7/1988 |
| JP | 01150105 | * | 6/1989 |
| JP | 02-126016 | | 10/1990 |
| JP | 4-332606 | | 11/1992 |
| JP | 06-212969 | | 8/1994 |
| JP | 7-47285 | | 2/1995 |
| JP | 9-504349 | | 4/1997 |
| JP | 9-158720 | | 6/1997 |
| JP | 9-314431 | | 12/1997 |
| JP | 11-258013 | | 9/1999 |
| JP | 2000-042421 | | 2/2000 |
| JP | 2000-45759 | | 2/2000 |
| JP | 2000-073746 | | 3/2000 |
| JP | 2000-202342 | | 7/2000 |
| JP | 2000-204931 | | 7/2000 |
| JP | 2000-291424 | | 10/2000 |

* cited by examiner

ASSEMBLING METHOD USING MARKED INFORMATION AND ASSEMBLY ASSEMBLED BY SAID ASSEMBLING METHOD

TECHNICAL FIELD

The present invention relates to an assembling method for an assembly in which a cell structure is housed and held in a metal vessel via a compressible material. More particularly, it relates to an assembling method for an assembly of members meeting a proper combination condition by marking inherent information on the surface of a member constituting the assembly in advance and by utilizing the information. The present invention can be applied to a carrier or filter for purification or deodorization of exhaust gas of internal combustion engine, a carrier or filter for chemical reaction equipment utilizing catalytic action, for example, such as a reformer for fuel cell, and the like.

BACKGROUND ART

There is known, as an assembly used for a catalytic converter or a filter for purification of exhaust gas of internal combustion engine or chemical reaction equipment utilizing catalytic action, a heat exchanger, or the like, said assembly comprising a cell structure being housed and held (canned) in a metal vessel by placing a compressible material having a cushioning property between the cell structure and the tubular metal vessel (can), with applying a predetermined mounting pressure to the cell structure via the compressible material.

For example, in the case where such an assembly is used as a catalytic converter for purifying automobile exhaust gas, a precious metal such as platinum, palladium, or rhodium is dispersedly carried on a ceramic honeycomb structure, which is one kind of cell structure, as a catalyst component, and the honeycomb structure carrying the precious metal is housed and held in a metal vessel (can) via a ceramic mat etc. and is mounted on an exhaust system.

It is desirable that the cell structure has a high strength because it is held in the metal vessel with applying a mounting pressure onto the outer peripheral surface thereof as described above. For the honeycomb structure used as a catalyst carrier for purifying automobile exhaust gas, however, the thinning of cell wall is now in progress for the improvement in the purification performance, and accordingly the strength level is being lowered.

The strength of cell structure can be measured by an "isostatic fracture strength test". This test is conducted by putting a cell structure in a tubular rubber vessel, placing a cover of aluminum plate on the vessel; and performing isostatic compressing in water; which simulates the compressive load in the case where the outer peripheral surface of cell structure is held by the can of converter. The isostatic strength is shown by a pressure value applied thereto at the time when the cell structure is fractured, and is specified in Automobile Standards JASO Standards M505-87 issued by Society of Automotive Engineers of Japan, Inc.

It has been found that it is generally very difficult for a ceramic honeycomb structure used as a catalyst carrier for an automobile exhaust gas purifying converter to keep an isostatic strength of 10 kg/cm$^2$ or higher if the cell wall thickness is 0.11 mm or smaller and the open frontal area ratio in the terms of percentage exceeds 85%.

In the case where a specific pressure higher than a design specific pressure set at the time of canning design is produced in actual canning and the specific pressure exceeds the isostatic strength of cell structure in some portion, there is a danger that the structure fractures in that portion. As the thickness of cell wall of cell structure becomes thinner and thus the strength level of structure is lowered, the design specific pressure must be lowered, and thus it is necessary to restrain an abnormal rise in specific pressure in actual canning and to reduce the variations in specific pressure as much as possible. If the actual specific pressure is equal to the design specific pressure, intended canning design can be made ideally.

Further, the cell structure may be fractured in the case where because a gap between the cell structure and the metal vessel for containing the cell structure is irregular due to poor accuracy of external shape of cell structure, the compressive pressure acting on the outer peripheral portion of cell structure is nonuniform, so that a high holding specific pressure acts partially.

On the other hand, if the specific pressure is decreased too much, the cell structure cannot be kept being held in the metal vessel because the cell structure is subjected to a high-temperature exhaust gas flow or vibrations in actual service environments. Therefore, the necessary minimum specific pressure exists. As the wall thickness of cell structure decreases, the isostatic strength level of cell structure decreases, so that the mounting pressure for holding the cell structure must also be decreased to the utmost while the minimum specific pressure necessary for holding the cell structure is maintained. As the level of mounting pressure decreases, variations in specific pressure must be decreased, that is, more even specific pressure distribution must be provided.

In order to house and hold the cell structure in the metal vessel in a proper state, it is desirable to decrease the variations in size and shape of the cell structure to the utmost. However, since the ceramic honeycomb structure used as a catalyst carrier as described above is dried as it is after being extrusion molded, and after being cut to a predetermined length, it is housed in the metal vessel in a state of being fired, the outside-diameter dimension of honeycomb structure involves dimensional variations and deformations in all processes of molding, drying, and firing. Therefore, the honeycomb structure has very large variations in size and shape as compared with a metal work.

In some cases, in a large-size honeycomb structure, the outer peripheral portion thereof is machined and removed after firing, and then the outer periphery is covered with ceramic cement. In general, however, the ceramic honeycomb structure is put to practical use without machining the outer peripheral portion thereof after firing. Therefore, studies have been carried out to increase the accuracy of outside diameter of ceramic honeycomb structure, and on the other hand, the problem is how the influence of outside-diameter dimension of ceramic honeycomb structure is kept little when the honeycomb structure is housed in the metal vessel.

The present invention has been made to solve the above problems, and accordingly an object thereof is to provide an assembling method in which when an assembly produced by housing and holding a cell structure in a metal vessel via a compressible material, even if the external-shape dimension of member such as the cell structure constituting the assembly has variations, the influence of variations is averted, and a proper holding state without a fracture etc. of cell structure can be obtained.

DISCLOSURE OF THE INVENTION

According to the present invention, there is provided an assembling method, as a first aspect of the present invention, for an assembly wherein a cell structure is housed and held in a metal vessel via a compressible material having a cushioning property by holding said cell structure with said compressible material, with placing said compressible material between the outer periphery of said cell structure and said tubular metal vessel in a compressed state so as to apply a mounting pressure to said cell structure via said compressible material, characterized by marking information regarding the outside dimension of said cell structure and/or the inside dimension of said metal vessel on the surface of a member of the assembly prior to the start of an assembling process, reading said information, and selecting a cell structure and a metal vessel so as to achieve a proper holding condition therebetween based on the read information in the assembling process.

Also, according to the present invention, there is provided an assembling method, as a second aspect of the present invention, for an assembly wherein a cell structure is housed and held in a metal vessel via a compressible material having a cushioning property by holding said cell structure with said compressible material, with placing said compressible material between the outer periphery of said cell structure and said tubular metal vessel in a compressed state so as to apply a mounting pressure to said cell structure via said compressible material, characterized by marking information regarding the outside dimension of said cell structure on the surface of a member of assembly prior to the start of an assembling process, reading said information, manufacturing a metal vessel so as to achieve a proper holding condition between said cell structure based on the read information, and combining thus formed metal vessel with said cell structure.

Further, according to the present invention, there is provided an assembly, as a third aspect of the present invention, assembled by either of the above-described methods.

Still further, according to the present invention, there is provided a cell structure, as a fourth aspect of the present invention, on which the information used in either of the above-described method is marked.

BEST MODE FOR CARRYING OUT THE INVENTION

Figure 1:
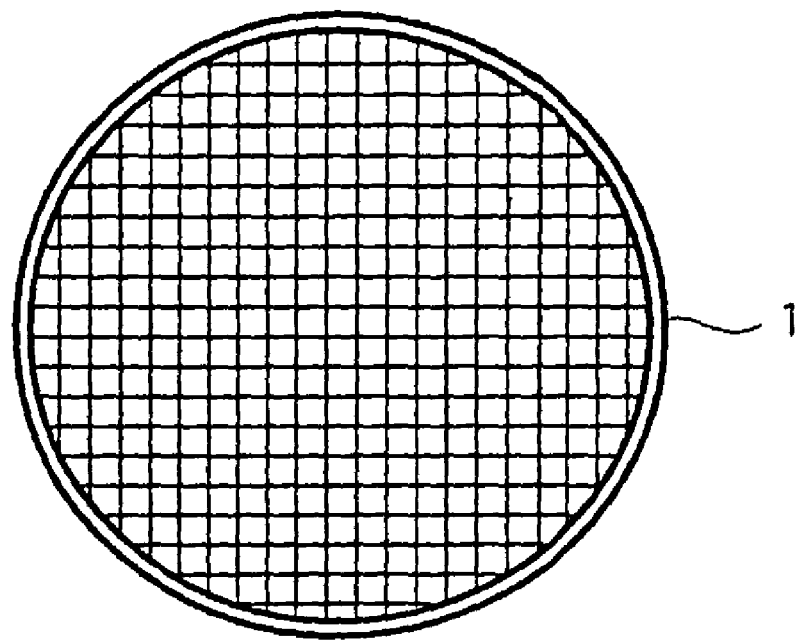
FIGS. 1(a) and 1(b) are explanatory views showing a honeycomb structure used as a cell structure in an embodiment, FIG. 1(a) being a plan view, and FIG. 1(b) being a perspective view.
Figure 1:
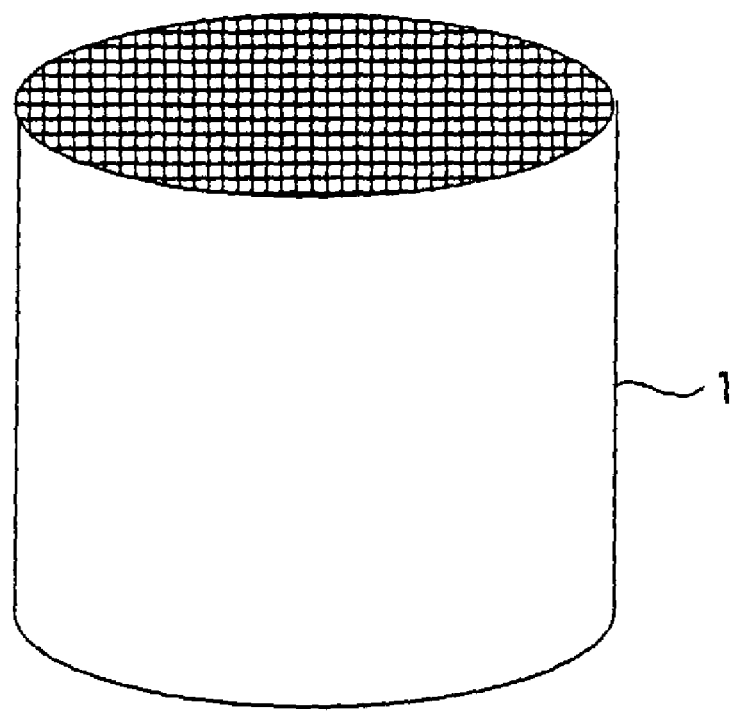

As described above, an assembly used for a catalytic converter or the like, in which a cell structure is housed and held in a metal vessel via a compressible material, is assembled by arranging the compressible material having a cushioning property between the outer periphery of cell structure and the tubular metal vessel in a compressed state and by applying a mounting pressure to the cell structure via the compressible material to hold the cell structure in the metal vessel.

A first aspect of the present invention has a feature described below. In the above-described assembling method for the assembly, information regarding the outside-diameter dimension of the cell structure and/or the inside-diameter dimension of the metal vessel has been marked on the member surface prior to the start of an assembling process, and in the assembling process, the information is read, and a cell structure and a metal vessel which have a proper holding condition are selected based on the read information.

By selecting a cell structure and a metal vessel which provide a proper combination of dimensions from the information regarding the outside-diameter dimension of cell structure and/or the inside-diameter dimension of metal vessel marked on the member surface as described above, a specific pressure is applied to the cell structure housed and held in the metal vessel in a proper range.

A second aspect of the present invention has a feature described below. In the above-described assembling method for the same assembly as described above, information regarding the outside-diameter dimension of the cell structure has been marked on the member surface prior to the start of an assembling process, and in the assembling process, the information is read, and a metal vessel is manufactured so as to have a proper holding condition based on the read information and combined with the cell structure.

By manufacturing a metal vessel having a proper inside-diameter dimension corresponding to the external-shape dimension of cell structure from the information regarding the inherent outside-diameter dimension of individual cell structure which is marked on the member surface and by combining the metal vessel with the cell structure as described above, a specific pressure is applied to the cell structure housed and held in the metal vessel in a proper range.

In the first and second aspects of the present invention, as a format for marking information, characters or a bar code may be used. The information may be marked by using two kinds of marking formats; for example, both formats for marking characters and a bar code may be used. Also, the information may be marked by ink application, laser, sandblasting, chemical corroding action, stamping using a stamp, or other means. Alternatively, the information may be printed on a label, and the label may be affixed onto the member surface. In the case where the information is marked by ink, the ink jet method or thermal transfer method is preferably used.

Regarding the marking method for the information as well, two kinds of methods may be used in combination with each other. For example, both marking methods of the ink jet method or thermal transfer method and the stamping method maybe used in combination with each other. Also, in the case where the information is marked by ink, two kinds of inks, for example, thermally resistant ink and non-thermally resistant ink may be used in combination with each other as necessary.

In the case where the assembly assembled by the method in accordance with the present invention is one in which a catalyst component is carried on the cell structure as in the case of catalytic converter, after the information is marked, lacquer, paraffin, resin such as vinyl, or a transparent water-repellent liquid such as silica sol is preferably applied onto the marked information.

The cell structure serving as a carrier is mainly colored various shades of blown ranging from liver brown to black depending on the kind and concentration of catalyst component after the catalyst component is carried. Also, the cell structure is heat-treated at a temperature of 400 to 800° C. to be baked to fix the catalyst component to the carrier. Therefore, in the case where the information is marked by ink, thermally resistant ink is used. Also, since the catalyst component is generally made a water solution to be carried on the carrier, it is desirable that the carrier (cell structure) have some degree of water absorbing property, so that a carrier made of a material having a porosity of about 20 to 40% is usually used.

If a catalyst is carried by pouring a water solution containing a catalyst component into through holes in the cell structure under such a condition without applying the aforementioned water-repellent liquid on the marked information, the water solution seeps to the outer peripheral wall of cell structure through communicating pores by means of the capillary phenomenon, so that a portion on the outer peripheral surface in which the information is marked is also colored. The kind of the thermally resistant ink is limited; the thermally resistant ink having a bright color is not available, and the color of most thermally resistant inks turns to a brown shade which is the same as the color of catalyst component after heat treatment. Therefore, if the portion in which the information is marked is also colored, the information becomes illegible. Especially when the portion is not colored uniformly, but is colored in a spotted manner, the information cannot be read by a reading method requiring brightness such as image analysis.

Contrarily, if the aforementioned water-repellent liquid is applied onto the marked information, the water-repellent liquid intrudes in the surface of marked portion and pores in the material, and repels the water solution seeping out to the outer peripheral wall by means of the capillary phenomenon and the water solution dripping onto the surface of outer peripheral wall. Therefore, the coloration of information marking portion is prevented, so that a legible state can be maintained.

The thermally resistant component of thermally resistant ink is a pigment (mineral powder). In the case where thermally resistant ink is used for ink jet, the particle size of the pigment thereof must be made small, and further the content of pigment cannot be increased, so that the print is light. In the case of stamping, the content of pigment can be increased as compared with the case of ink jet, so that the stamped print is thick and dark, and thus contrast is secured. As a result, the seeping of catalyst component is prevented, so that the legibility can be enhanced.

In the case of stamping, however, stamping is performed mechanically, which presents a drawback in that much time is taken as compared with the case of ink jet. Therefore, in some cases, it is favorable that printing is performed by ink jet on a high-speed line, and stamping is performed on another line. In this case, in the case where thermal resistance is needed finally, if the ink used for stamping is made thermally resistant, the ink used for ink jet need not necessarily be thermally resistant.

As the compressible material having a cushioning property, one kind of material or a composite material consisting of two or more kinds of materials selected from a group consisting of a metallic wire mesh, an intumescent mat formed by ceramic fiber and vermiculite, and non-intumescent mat containing ceramic fibers as a major component, but free from vermiculite is preferably used.

Especially when the cell structure is a thin wall construction, if a non-intumescent mat containing, as a major component, ceramic fibers being made of alumina, high alumina, mullite, silicon carbide, silicon nitride, zirconia, titania, and the like, but being free from a thermally expansive material such as vermiculite is used, a compressive force acting on the outer periphery of cell structure in the practical temperature range does not vary greatly, and moreover the compressive force preferably acts on the whole of the outer periphery of cell structure substantially uniformly.

As a method for housing the cell structure in the metal vessel and applying a mounting pressure to the cell structure via the compressible material, any of the clamshell method, stuffing method, tourniquet method, shrinking method, and rotary forging method is preferably used.

As a cell structure, a honeycomb structure having a plurality of cell passages formed by a plurality of walls, the thickness of cell wall being 0.11 mm or smaller, and the open area percentage being 85% or more, is preferable. Further, as a honeycomb structure, a structure having an external wall forming an outside-diameter contour around the structure, the thickness of external wall being at least 0.05 mm, is preferable. As a cell structure used in the present invention, in addition to the above-described honeycomb structure, a foamed structure may be used.

The cell structure is preferably formed of one kind of ceramic material or a composite consisting of two or more kinds of ceramic materials selected from a group consisting of cordierite, alumina, mullite, lithium aluminum silicate, aluminum titanate, titania, zirconia, silicon nitride, aluminum nitride, and silicon carbide. Also, the cell structure formed of one kind of adsorbing material selected from a group consisting of activated carbon, silica gel, and zeolite can be used suitably.

The cell shape of honeycomb structure manufactured by extrusion molding may be triangular, quadrangular, hexagonal, round, etc. Generally, the honeycomb structure having a square shape, which is one of quadrangular shapes, is often used, and in recent years, the honeycomb structure having a hexagonal shape has been used increasingly.

In the case where the cell structure is used as a catalytic converter, a catalyst component must be carried on the cell structure. Usually, after the catalyst component is carried on the cell structure, the cell structure is housed and held in the metal vessel. However, the method may be such that after the cell structure is housed and held in the metal vessel, the catalyst component is carried on the cell structure.

A third aspect of the present invention provides an assembly assembled by the method in accordance with the first or second aspect of the present invention. Since the cell structure is held in the metal vessel with a proper mounting pressure, the assembly can be used suitably for a catalytic converter for purifying automobile exhaust gas and other applications. Also, a fourth aspect of the present invention provides a cell structure before assembling on which the information used in the method in accordance with the first or second aspect of the present invention is marked, on which the information is marked in advance with various formats and means, by which the assembling method in accordance with the first or second aspect of the present invention is carried out based on the information.

The assembly may be constructed so that a plurality of cell structures are arranged in series along the cell passage direction in one metal vessel via a compressible material having a cushioning property. Also, a plurality of assemblies each of which houses and holds one cell structure in one metal vessel via a compressible material having a cushioning property are arranged in series along the cell passage direction of the cell structure in one metallic outer casing. In the present invention, however, the size of metal vessel is changed according to the outside-diameter dimension of individual honeycomb structure. Therefore, in the case where a plurality of metal vessels are connected to each other, it is desirable to connect the metal vessels that have a size as close as possible to each other.

EXAMPLE

Hereunder, the present invention will be described in detail giving an example of the case where a catalytic converter is manufactured by using a honeycomb structure 1 shown in FIGS. 1(a) and 1(b) as a cell structure. The present invention is not limited to this example.

As a method for marking information such as characters or a bar code on a honeycomb structure, a method using an ink jet printer is desirable in terms of treatment of large quantities of members because this method has a high printing speed and is of non-contact type. In particular, a marking method using a laser is preferable to the ink jet method in terms of maintenance because this method does not require ink and pretreatment.

Figure 2:
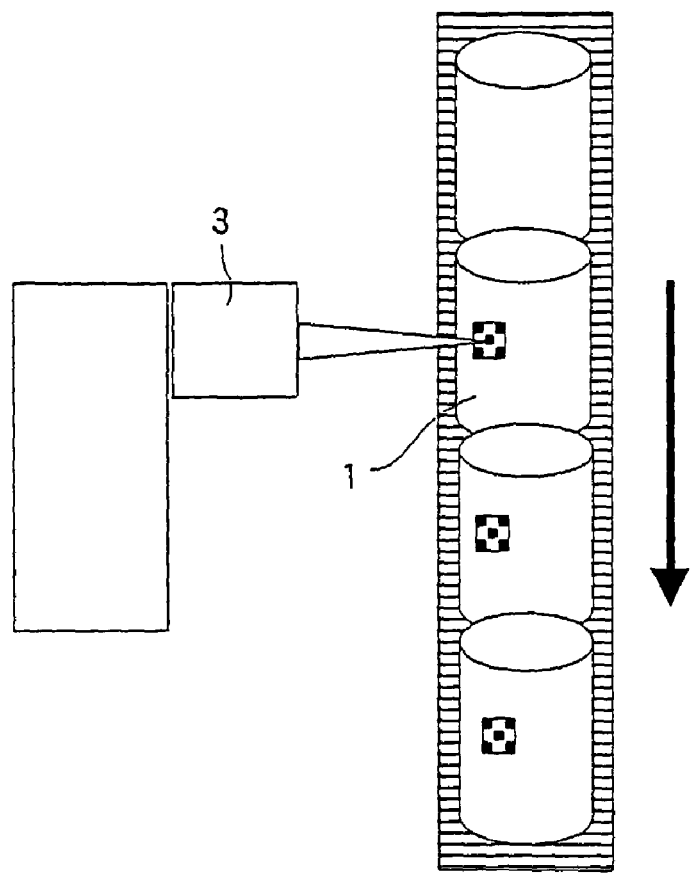
FIG. 2 is an explanatory view showing a marking method for a bar code by using a laser marker.

The dimensional inspection of honeycomb structure is carried out at the final stage of manufacturing process of honeycomb structure. The configuration is made in advance such that the information about the outside-diameter dimension measured in the inspection is sent directly to a laser marker. As shown in FIG. 2, the honeycomb structure 1 coming out of a measuring device is conveyed to the laser marker 3 and is marked with a bar code on the external surface of the honeycomb structure 1 based on the information about the outside-diameter dimension. The QR code is suitable because the marking area is small, so that the marking time is short, and also this code is less affected by the curvature of external surface of honeycomb structure.

One example of laser marking conditions will be described below. As a laser marker, a YAG pulse laser or a $CO_2$ laser is suitable.

Laser Marker:

YAG laser marker (lamp excited type ML-4141B manufactured by Miyachi Technos Corp.)

Honeycomb Structure:

Cordielite honeycomb structure (wall thickness: 2 mil, cell density: 900 cpsi, nominal outside diameter: 106 mm, length: 114 mm)

Marking Conditions:

Current: 17A, SW frequency: 8 kHz, scanning speed 150 to 1000 mm/s

Type of Bar Code:

CODE 39 or QR code, narrow width of CODE 39: 0.38 mm, cell size of QR code: 0.508 mm Information carried on Bar Code:

Actually measured average dimension of outside diameter of honeycomb structure

The ceramic honeycomb structure having been marked with a bar code under the above-described laser marking conditions in the manufacturing process is sent to a catalyst component carrying process. In this process, a catalyst component is carried on the honeycomb structure conveyed in a catalyst carrying device.

Examples of conditions in the cases of ink jet and stamping carried out as another marking method will be described below.

Example of Ink Jet

Ink Jet Device:

S4 Plus manufactured by Imaje Ltd.

Type of Ink:

Thermally resistant ink (at ordinary temperature: dark brown colored, after heat treatment: orange colored)

Honeycomb Structure:

Cordielite honeycomb structure (wall thickness: 2 mil, cell density: 900 cpsi, nominal outside diameter: 106 mm, length: 114 mm)

Format of Information Carried on Honeycomb Structure:

Numeral

Information carried on Honeycomb Structure:

Actually measured average dimension of outside diameter of honeycomb structure (strikethrough: and actually measured mass)

After numerals were printed under the above-described conditions, a frame larger than the marked information by about 5 mm in length and breadth was prepared, and an overcoat was applied in the frame under the following conditions. After a catalyst component was carried on the honeycomb structure, it was checked whether the information could be recognized by image analysis. Also, for comparison, a honeycomb structure in which the overcoat was not applied was examined. As a result, for the honeycomb structure to which the overcoat was not applied, especially the information-marking portion is colored in a spotted manner, the information could not be recognized, the letter recognition percentage being 60%. On the other hand, for the honeycomb structure to which the overcoat was applied, since a catalyst did not seep to the external wall marked with information in the carrying process in which a water solution containing a catalyst component was carried, the information remained clearly, the percentage of recognizing numerals by means of image analysis being 100%.

(Condition 1)

Overcoat Material:

Transparent paint (acrylic resin, manufactured by Asahipen Corp.)

Application Condition:

Spraying for about 2 seconds (Condition 2)

Overcoat Material:

Silica gel manufactured by Nissan Chemical Industries, Ltd.

Application Condition:

Applied two times (Condition 3)

Overcoat Material:

Substance obtained by dissolving silica powder in water

Application Condition:

Applied two times

Example of Stamping

Ink Pigment:

Fine powder of cobalt oxide (CoO), chromium oxide ($Cr_2O_3$), and iron oxide ($Fe_2O_3$) 40% (color: black at ordinary temperature and after heat treatment)

Synthetic Resin:
50%
Water:
10%
Honeycomb Structure:
Cordielite honeycomb structure (wall thickness: 2 mil, cell density: 900 cpsi, nominal outside diameter: 106 mm, length: 114 mm)
Format of Information carried on Honeycomb Structure:
Numeral
Information carried on Honeycomb Structure:
Actually measured average dimension of outside diameter of honeycomb structure (strikethrough: and actually measured mass)

Under the above-described conditions, an ink material was dissolved and put in a stamp pad, and the information was stamped on the honeycomb structure using a rubber stamp. After stamping was performed, as in the case of the ink jet, an overcoat was applied. After a catalyst component was carried on both of the honeycomb structure to which the overcoat was applied and the honeycomb structure to which the overcoat was not applied, it was checked whether the information could be recognized by image analysis. In this example, the catalyst carrying was performed by using a blackish brown colored catalyst component. Even when the overcoat was not applied, and the information marked portion is colored in a spotted manner, only blurredly stamped letters could not be recognized by image analysis, the recognition percentage being about 96%. Also, for the honeycomb structure to which the overcoat was applied, the letter recognition percentage was 100%.

The honeycomb structure on which the catalyst component is carried was conveyed to a catalyst baking process, and is treated at a temperature of 400 to 800° C. in this process. There is a fear that the information marked on the honeycomb structure is made illegible or is lost by heat due to the discoloration of honeycomb structure in the catalyst component carrying process or in the baking process. Therefore, when the ink jet method is used, it is desirable to use thermally resistant ink.

In general, the catalyst component is not carried on the external surface of honeycomb structure by masking. Therefore, the marked bar code etc. are not buried by the catalyst component. However, since slight discoloration is inevitable, the marking conditions of the bar code etc. must be set so that the bar code etc. are legible. In the case of laser marking, since the surface of member is decomposed and removed in a very shallow region, the honeycomb structure which has passed through the catalyst component carrying process and on which the catalyst component has been carried is conveyed to the canning process.

In the canning process, the bar code which carries the information about the outside-diameter dimension of honeycomb structure is read by a bar-code reader. The read dimensional information is sent momentarily to the metal vessel manufacturing line. The metal vessel is formed by rounding a thin metal sheet to a predetermined dimension by using a press jig and by joining the joint portions by welding to form a can shape. The aforementioned information is sent to the can manufacturing device, and the dimension of can is determined based on this information. Thus, the clearance between the honeycomb structure and the metal vessel (can) is controlled, and the optimum combination is realized.

The specific pressure also varies depending on the bulk density of compressible material interposed between the honeycomb structure and the metal vessel. Therefore, in order to obtain the optimum combination of the clearance between the honeycomb structure and the metal vessel and the bulk density of compressible material, the metal vessel and the compressible material can be selected based on the bar-code information on the honeycomb structure. There is generally known a method in which characters are used as information transmitting means in place of bar code.

The character information as well can be printed by the ink jet method or the laser marking method. In this case, the printed character information is photographed by a CCD camera, and is recognized by the pattern matching method. This method is to register characters in advance and to select a pattern closest to the registered characters from the shading information of photographed characters. The inventors read the outside-diameter dimension marked by the aforementioned laser marking method and the numerical information about mass by using an F350 image recognizer manufactured by Omron Corp., and verified that the information could be transmitted correctly.

The reading principle of bar-code reader is as described below. A laser beam is irradiated on a bar-code label, and the irregularly reflected light is received by the light-intercepting portion of bar-code reader. The irregularly reflected light produces a difference in intensity due to a difference in reflectance between space and bar. By changing this difference to an ON/OFF digital signal, the space and bar are discriminated, whereby the bar code is read. Therefore, even in the case of bar code, when the difference in intensity of irregularly reflected light (PCS) is small, it is difficult to read the bar code using the bar-code reader, so that the aforementioned image recognizing method is effective.

Figure 3:
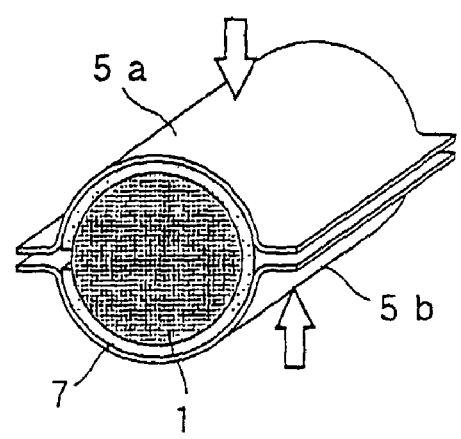
FIG. 3 is an explanatory view showing a case where a honeycomb structure is housed and held in a metal vessel by using the clamshell method.
Figure 4:
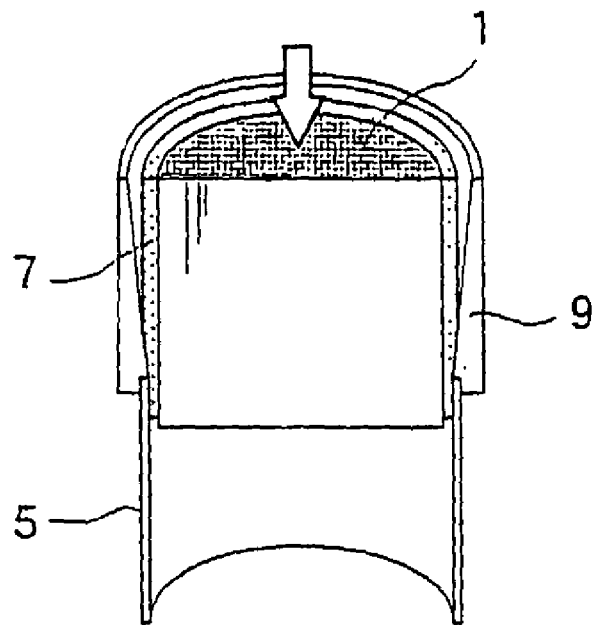
FIG. 4 is an explanatory view showing a case where a honeycomb structure is housed and held in a metal vessel by using the stuffing method.
Figure 5:
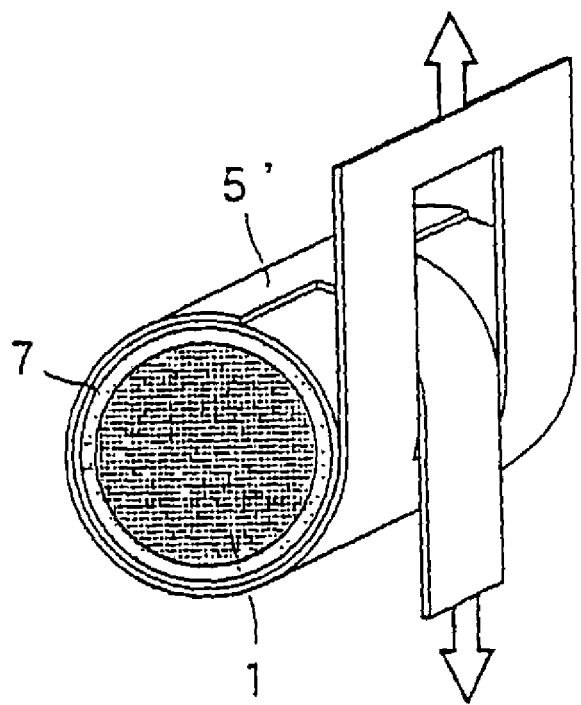
FIG. 5 is an explanatory view showing a case where a honeycomb structure is housed and held in a metal vessel by using the tourniquet method.
Figure 6:
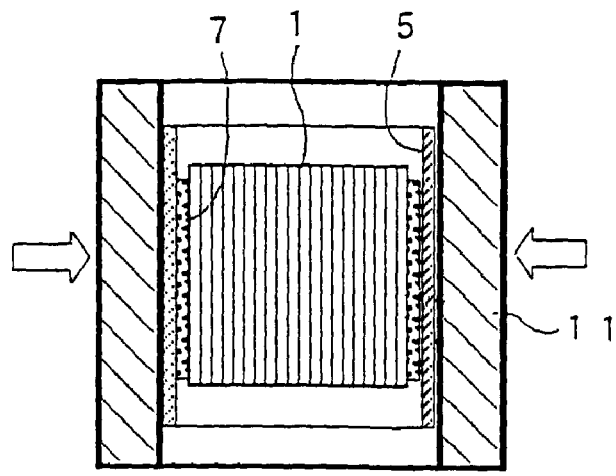
FIG. 6 is an explanatory view showing a case where a honeycomb structure is housed and held in a metal vessel by using the shrinking method.
Figure 7:
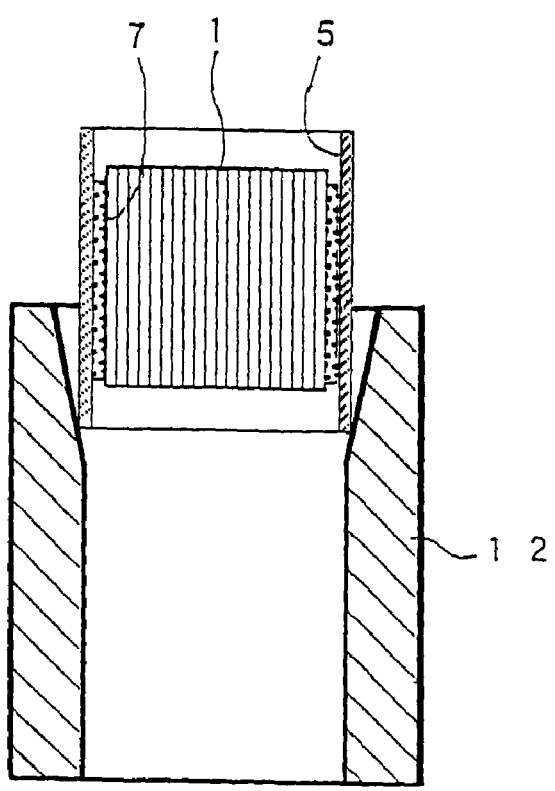
FIG. 7 is an explanatory view showing a case where a honeycomb structure is housed and held in a metal vessel by using the shrinking method.

As a general canning method, any method of the clamshell method shown in FIG. 3, the stuffing method shown in FIG. 4, or the tourniquet method shown in FIG. 5 is used. Besides, the shrinking method using the technology for plastic working of metal is carried out. Specifically, as shown in FIG. 6, the outside-diameter dimension of the metal vessel 5 is decreased by applying a compressive pressure from the outside via a tap (pressurizing type) 11, or as shown in FIG. 7, the outside-diameter dimension of the metal vessel 5 is decreased by pressing the metal vessel 5 into a jig 12 having a taper in the inner peripheral portion near one opening end.

Figure 8:
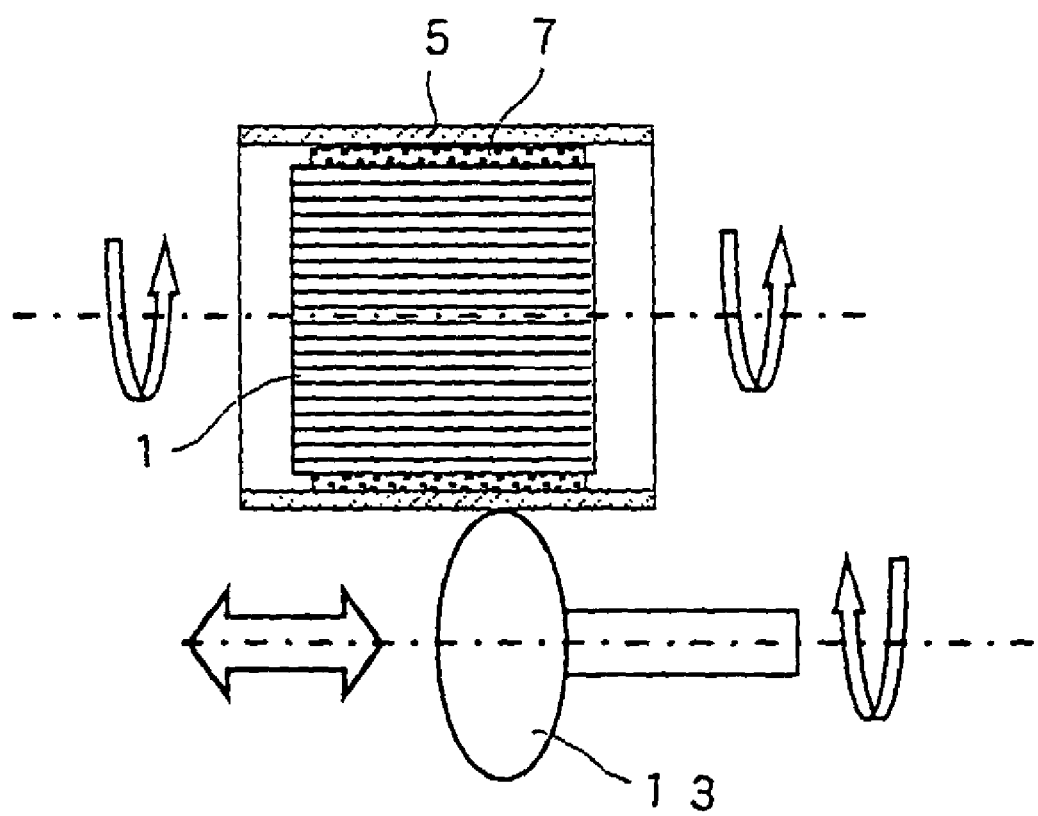
FIG. 8 is an explanatory view showing a case where a honeycomb structure is housed and held in a metal vessel by using the rotary forging method.

Further, as shown in FIG. 8, by using a method in which the outer peripheral surface of the metal vessel 5 is pressed by plastic working using a working jig 13 while the metal vessel 5 is rotated (what is called a rotary forging method), the outside diameter of the metal vessel 5 can be decreased, and thus a specific pressure can be applied. By the use of this method, in combination with the working in which both ends of can are drawn into a cone shape by spinning, which has been done recently, working ranging from canning to cone forming can be performed on an integrated working line.

In the above-described clamshell method, stuffing method, and tourniquet method, as shown in FIGS. 3 to 5, respectively, a compressive elasticity holding material (compressible material) 7 is wound around the honeycomb structure 1 in advance. In the clamshell method, as shown in FIG. 3, the honeycomb structure 1 with the compressible material 7 being wound is held by a two-piece metal vessel 5a, 5b while a load is applied, and the joint face (collar) portions are welded to form an integrated vessel. In the stuffing method, as shown in FIG. 4, the honeycomb structure 1 with the compressible material 7 being wound is pressed into an integrated metal vessel 5 by using a guide 9. In the tourniquet method, as shown in FIG. 5, a metal plate 5' serving as the metal vessel is wound around the honeycomb structure 1 with the compressible material 7 being wound and is pulled to provide a specific pressure, and the joint portions of the metal plate 5' are welded and fixed.

According to the clamshell method, when the honeycomb structure is pressed from the upside and downside, a shift of mat (compressive material) occurs. In the stuffing method, when the honeycomb structure is inserted into the metal vessel, a shift of mat occurs on the insertion side. Therefore, if the shifted portion spreads to a wide range, the specific pressure increases as a whole as well.

A method suitable for applying a specific pressure is to hold the honeycomb structure in the metal vessel while a specific pressure is applied with a shift of relative position of the mat and the metal vessel being made as small as possible. From this point of view, the tourniquet method, shrinking method, and rotary forging method are desirable because the can surrounds the cell structure wound with the compressible material prior to the application of a specific pressure so that the shift of relative position between the can and the compressible material is small. A procedure can also be carried out in which the stuffing method is used only to arrange the honeycomb structure in the can and the shrinking method or the rotary forging method is used to apply a specific pressure.

A method can also be used in which after the honeycomb structure is held in the metal vessel before the catalyst component is carried, the catalyst component is carried on the honeycomb structure in the metal vessel. According to this method, the honeycomb structure can be prevented from chipping or fracturing during the catalyst component carrying process.

INDUSTRIAL APPLICABILITY

As described above, according to the present invention, when an assembly in which a cell structure is housed and held in a metal vessel via a compressible material, even if the external-shape dimension of the cell structure etc. constituting the assembly varies, the influence of variation can be made little, and a proper holding state without a fracture etc. of cell structure can be obtained easily.

The invention claimed is:

1. An assembling method for an assembly wherein a cell structure is housed and held in a metal vessel via a compressible material having a cushioning property, said method comprising:

using ink to record information onto an outside surface of a cell structure, the recorded information regarding an outside dimension of the cell structure;

applying a transparent water-repellent liquid onto said recorded information;

applying; a catalyst-containing liquid onto inside surfaces of the cell structure;

heat-treating the cell structure at a temperature of 400 to 800° C. to fix the catalyst to the cell structure;

checking said recorded information on the outside surface of the cell structure with an image analyzer;

reading said recorded information;

determining an inside dimension for a metal vessel based on the recorded information read from the outside surface of the cell structure;

forming the metal vessel to a predetermined dimension larger than that indicated by said recorded information;

surrounding an outer periphery of the cell structure with the compressible material;

surrounding the cell structure and compressible material with the metal vessel having the predetermined dimension larger than that indicated by said recorded information before the metal vessel is sized to the determined inside dimension through pressure applied to the outside surface of the metal vessel; and then fixing the cell structure and compressible material in a compressed state in the metal vessel by sizing the metal vessel using one of a shrinking method and a rotary forging method to reduce an inside diameter of the metal vessel to the determined dimension.

2. The assembling method according to claim 1, wherein a recording format of said information is characters.

3. The assembling method according to claim 2, wherein said information is recorded by thermally resistant ink.

4. The assembling method according to claim 2, wherein said information is recorded by two kinds of inks.

5. The assembling method according to claim 2, wherein said information is recorded by both thermally resistant ink and non-thermally resistant ink.

6. The assembling method according to claim 2, wherein the method for recording said information by ink is an ink jet method or a thermal transfer method.

7. The assembling method according to claim 2, wherein said information is recorded by stamping using a stamp.

8. The assembling method according to claim 2, wherein said information is recorded with two kinds of recording methods.

9. The assembling method according to claim 2, wherein said information is recorded with both recording methods of an ink jet method or a thermal transfer method and a stamping method using a stamp.

10. The assembling method according to claim 1, wherein a recording format of said information is a bar code.

11. The assembling method according to claim 1, wherein said information is recorded with two kinds of recording formats.

12. The assembling method according to claim 1, wherein said information is recorded with both of recording formats of characters and a bar code.

13. The assembling method according to claim 1, wherein said water-repellent liquid is a resin or silica sol.

14. The assembling method according to claim 1, wherein said compressible material having a cushioning property is one kind of material or a composite material consisting of two or more kinds of materials selected from a group consisting of a metallic wire mesh, an intumescent mat formed by ceramic fiber and vermiculite, and non-intumescent mat containing ceramic fibers as a major component, but being free from vermiculite.

* * * * *